Nov. 10, 1931.    M. A. AROSTEGUI    1,831,733
PIANO PEDAL
Filed July 9, 1930
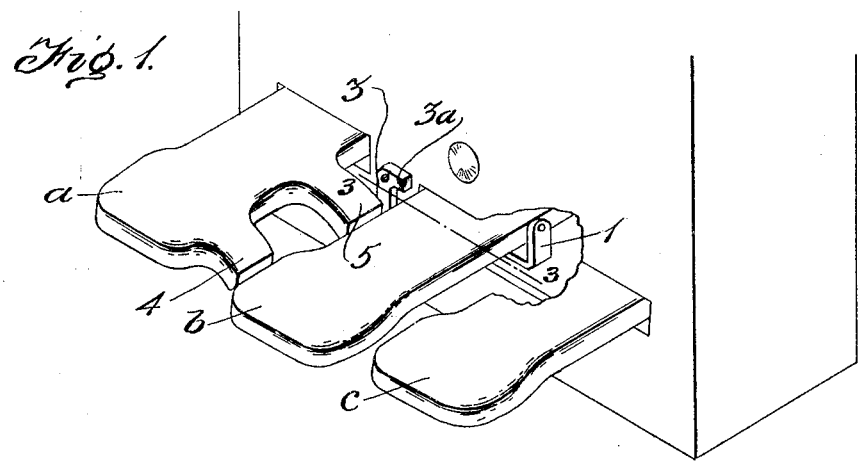
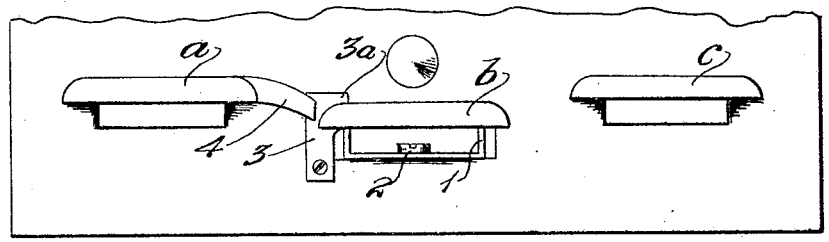
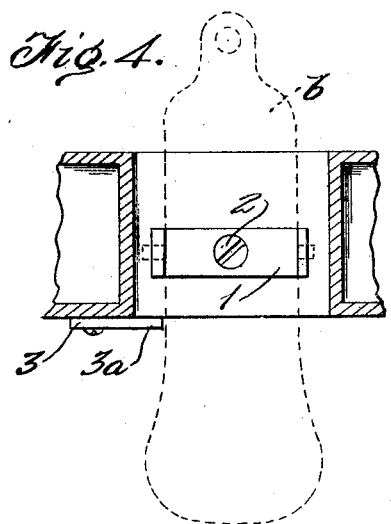
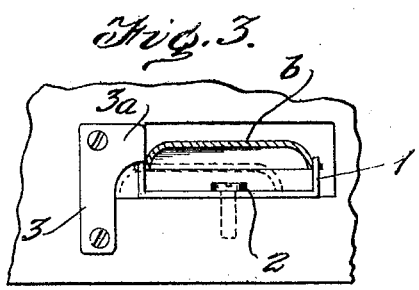
INVENTOR.
M. A. Arostegui
BY Robert Watson
ATTORNEY.

Patented Nov. 10, 1931

1,831,733

UNITED STATES PATENT OFFICE

MARIA A. AROSTEGUI, OF MATANZAS, CUBA

PIANO PEDAL

Application filed July 9, 1930. Serial No. 466,843.

This invention relates to piano pedals, and more particularly to means for facilitating the use of the pedal for sustaining the notes. In carrying out the invention, I mount the sustaining pedal a little lower than the soft pedal and provide the latter with projections which extend laterally to guide the foot of the operator easily and surely from one pedal to the other. I also mount the sustaining pedal so that it can swing to a limited extent horizontally, and I provide a catch for locking the sustaining pedal in its depressed position, when desired. The arrangement is such that the operator's left foot, pivoting on the heel and extending normally over the soft pedal, may swing surely and easily on to the sustaining pedal, and upon depression of the latter a reverse swinging movement of the foot will carry the sustaining pedal laterally under the catch so that this pedal will remain depressed after the operator's foot has been returned to its normal position over the soft pedal. When it is desired to release the sustaining pedal from the catch, a lateral movement of the foot from the soft pedal on to the sustaining pedal will move the latter from under the catch, and upon raising the foot and returning it to the soft pedal, the sustaining pedal will resume its normal position.

In the accompanying drawings,

Fig. 1 is a front perspective view of the pedals, mounted in a pedal-box, the latter being partly broken away to show the swiveled yoke in which the central pedal is carried;

Fig. 2 is a front elevation of the same;

Fig. 3 is a section on the line 3—3 of Fig. 1; and,

Fig. 4 is a detail section on the line 4—4 of Fig. 2.

Referring to the drawings, $a$, $b$, and $c$ indicate the pedals of a piano, having their usual sound-regulating functions, the pedal $a$ being the "soft" pedal, the pedal $c$ being the "loud" pedal, and the central pedal $b$, when depressed, causing the notes to be sustained.

The pedals $a$ and $c$ may be mounted in any usual way for vertical rocking movement; but the pedal $b$ is mounted so that it may swing laterally to a limited extent and also rock vertically. Thus, a metal yoke 1 is centrally pivoted on a stud 2 in the pedal-box, and this yoke has upstanding arms in which pintles on the sides of the pedal $b$ are pivoted, as shown. The yoke, carrying the pedal, may swing horizontally about the stud 2 as an axis, and the pedal may rock vertically on its pintles. A catch 3 is secured to the front of the pedal-box at the left of the pedal $b$, this catch consisting of a metal strip having a shoulder $3^a$ which projects toward the pedal. If the pedal $b$ is depressed and then swung to the left, as indicated in dotted lines in Fig. 3, the side of the pedal will pass under the shoulder on the catch and the pedal will be locked in its lowered position until moved to the right, when it will spring upwardly into the full line position, shown in said figure.

The pedal $b$, as will be seen in Figs. 1 and 2, is mounted a little lower than the other pedals, and the pedal $a$ is provided with lateral extensions 4 and 5, the upper surfaces of which curve downwardly from the upper surface of the pedal $a$ toward the upper surface of the pedal $b$. These lateral extensions are for the purpose of easily and surely guiding the operator's foot from the pedal $a$ on to the pedal $b$, and back again.

In playing the piano, the pedals $a$ and $c$ are operated in the usual manner. When the operator desires to depress the sustaining pedal $b$, the left foot, which pivots on the heel and normally extends over the soft pedal $a$, is moved along the lateral projection 5 of the pedal $a$ on to the pedal $b$, and the latter is depressed. While the pedal $b$ is depressed, a side movement of the operator's foot toward the pedal $a$ will cause the pedal $b$ to swing horizontally and its edge will pass under the shoulder $3^a$ of the catch, and the pedal will then be locked in its lowered position, and the operator's foot will move over projection 4 to its position over the soft pedal. To release the pedal $b$, the operator's left foot is slid from the pedal $a$, over guide projection 4, on to the pedal $b$ and this lateral movement of the foot, accompanied by downward pressure on the end of the pedal, causes the pedal *b* to swing from under the catch and when the pressure of the foot is taken off of the pedal, it springs upwardly to its normal position, as the operator's foot swings lightly over the guide 5 on to the pedal *a*.

Very commonly, the use of the sustaining pedals of pianos is neglected because of the difficulty of shifting the foot from its assigned pedal on to the sustaining pedal, and because the sustaining pedal is not usually provided with means whereby it can be readily locked and released, so as to leave the foot free to operate its assigned pedal. By means of my improvements, it will be evident that the sustaining pedal can be readily locked and released and this leaves the operator's foot free to operate its assigned pedal.

What I claim is:

1. In a piano, a soft pedal and a sustaining pedal arranged side by side, the soft pedal pivoted to rock vertically, a yoke in which the sustaining pedal is pivoted for vertical movement, said yoke being swiveled to permit the sustaining pedal to swing horizontally, and a catch, at the side of the sustaining pedal, adapted to lock the latter pedal when it is depressed and moved to one side of its normal position.

2. In a piano, a soft pedal, a sustaining pedal mounted lower than and adjacent to the soft pedal, said soft pedal having a lateral extension for guiding the foot of the operator from the latter pedal to the sustaining pedal.

3. In a piano, a soft pedal and a sustaining pedal arranged side by side, a catch adjacent the latter pedal, said pedals pivoted to rock vertically and said sustaining pedal being pivoted to permit of horizontal swinging movement toward and from the soft pedal, and adapted to engage under said catch when depressed and moved toward the soft pedal.

4. In a piano, a soft pedal having two lateral extensions, spaced apart, and extending downwardly, a sustaining pedal adjacent to and below the soft pedal, said sustaining pedal being movable in a horizontal plane, and a catch adapted to lock the sustaining pedal when the latter is depressed and moved toward the soft pedal.

In testimony whereof I affix my signature.

MARIA A. AROSTEGUI.